Aug. 14, 1962 B. B. ELDER ET AL 3,049,319
AIRCRAFT TOW TARGET INSTALLATION
Filed Dec. 7, 1959 7 Sheets-Sheet 1

INVENTORS:
Boyd B. Elder
Russell A. Wilmot

Attorneys

3,049,319
AIRCRAFT TOW TARGET INSTALLATION
Boyd B. Elder, Los Angeles, and Russell A. Wilmot, Redondo Beach, Calif., assignors to Del Mar Engineering Laboratories, Los Angeles, Calif., a corporation of California
Filed Dec. 7, 1959, Ser. No. 857,805
17 Claims. (Cl. 244—2)

This invention relates to apparatus on an aircraft for launching and retrieving a tow target. More particularly, the invention refers to an aircraft installation of the general character disclosed in the Hopper patent 2,813,719, issued November 19, 1957, entitled "Aircraft Tow Target Installation," which disclosure is hereby incorporated in the present disclosure by reference.

In the Hopper disclosure, a towline attached to the nose of a streamlined tow target is controlled by a reel in a streamlined reeling unit on the underside of the towing aircraft. The towline extends a few feet from the reeling unit to a streamlined launcher that is mounted on the underside of a wing of the aircraft, the towline being routed through the launcher to the tow target. The launcher is longitudinally contractible against the force of a heavy spring and is released from its contracted state for forceful expansion to thrust the tow target clear of the towing aircraft.

For transportation of the tow target to a target practice area, the tow target is snubbed to the launcher with the launcher contracted. When the target practice area is reached, the reel is released for rotation and the launcher is unlatched for its spring-actuated expansion to launch the tow target. At the end of a target exercise, the reel is actuated to retrieve the tow target. The tow target is reeled into contact with the expanded launcher and the reeling action is then continued sufficiently to contract the launcher.

In the Hopper disclosure, the launcher is necessarily mounted close to the underside of the aircraft wing to keep the tow target from interfering with landing and take-off of the towing aircraft. Unfortunately, however, such a location close to the underside of the aircraft wing is in a violently turbulent zone of the slip stream. When the tow target is launched into this turbulent environment it is violently buffeted with the likelihood of the tow target being damaged or lost and the further possibility of the tow target damaging the aircraft. Later, when the tow target is reeled in to approach the launcher, it is again violently buffeted by the turbulent air and fights against being seated against the launcher. Here again, there is a serious risk of the tow target being damaged or being entirely lost by breaking away from the towline.

The present invention avoids these difficulties by mounting the launcher on a pivoted boom. Normally the boom lies substantially horizontally to hold the tow target close to the underside of the aircraft wing for take-off and for landing. In preparation for launching or retrieving the tow target, however, the boom is swung downward to place the launcher in free air outside of the zone of turbulence that is created by the aircraft. With the launcher in this relatively remote position, the surrounding air flows relative to the launcher in a stable manner and the behavior of the launcher tow target is stable as it departs from the launcher.

Once the tow target is launched, and an initial portion of the tow cable has been payed out, the boom may be swung upward to position the launcher close to the underside of the wing as the aircraft is maneuvered through the target exercise. Later the boom is swung downward to place the launcher again in an aerodynamically stable zone. The tow target then follows an even course as it approaches the launcher, as it seats against the launcher and as it follows the retraction movement of the launcher.

In carrying out this new concept, the problem arises of how to relate such a swinging boom to the reeling unit and especially of how to keep the swinging action from affecting the tension of the towline. This problem is solved in a number of different ways in different embodiments of the invention. In one embodiment, the problem is solved by making at least a portion of the reeling unit rotatable concentrically about its longitudinal axis and by making the boom unitary with the rotary structure of the reeling unit. This arrangement, in effect, unites the launcher housing with the reeling unit housing and also makes it possible to mount the power means for the boom inside the reeling unit housing. The whole reeling unit housing is journaled for rotation in a pair of support rings that are fixedly mounted on the aircraft, and one of the support rings carries a fixed ring gear exposed inside the reeling unit housing. The power means inside the reeling unit housing for swinging the boom drives a pinion that meshes with and travels around the ring gear. Thus energization of this power means rotates the reel housing concentrically about its longitudinal axis and thereby swings the boom that is unitary with the housing. By virtue of this arrangement the orientation of the reel relative to the boom is constant at all angular positions of the boom so that the tension of the towline is not affected by the swinging action of the boom.

A second embodiment of the invention provides a second solution to the problem of how to keep the swinging action of the boom from affecting the tension of the towline. This solution is to mount the launcher on a boom in the form of a parallel linkage mechanism to swing between an upper position and a lower position with the launcher remaining generally horizontal throughout the swinging movement. The towline is so routed along the parallel linkage that in the course of the swinging movement a wrapping action of the towline on one guide pulley is compensated by a simultaneous unwrapping action on a second guide pulley with consequent substantial constant tension on the towline throughout the swinging movement.

In a third embodiment of the invention, a portion of the towline is routed along an axis about which the boom swings between its upper and lower positions. The portion of the towline that extends along this axis is merely subjected to twisting action or untwisting action in the course of the swinging movement of the boom with no appreciable effect on the tension of the towline.

Other features of the invention refer to certain safety features. One of these safety features comprises a latch which, in effect, secures the launcher directly to the aircraft wing at the upper retracted position of the boom. This latch prevents inadvertent lowering of the boom or lowering of the boom by structural failure during take-off and landing. Another safety feature comprises automatic means to lock the snubbed tow target in its seat in the contracted launcher whenever the boom is in its upper retracted position. The direct anchorage of the tow target to its seat on the end of the boom makes the anchorage of the tow target independent of the towline. This arrangement prevents release of the snubbed tow target during take-off or landing by failure of the towline or failure of the mechanism that controls the towline.

Still another safety feature is that the launcher is also locked in its contracted state when the tow target is locked to the launcher. As the boom is swung from its lower extended position to its upper retracted position with the tow target snubbed to the launcher, the automatic locking means responds to the upward movement of the boom not only to lock the snubbed tow target to the launcher as mentioned above but also to lock the launcher in its contracted state.

The above and other features and advantages of the invention may be further understood by reference to the following detailed description together with the accompanying drawings.

In the drawings, which are to be regarded as merely illustrative.

General Arrangement

Figure 1:
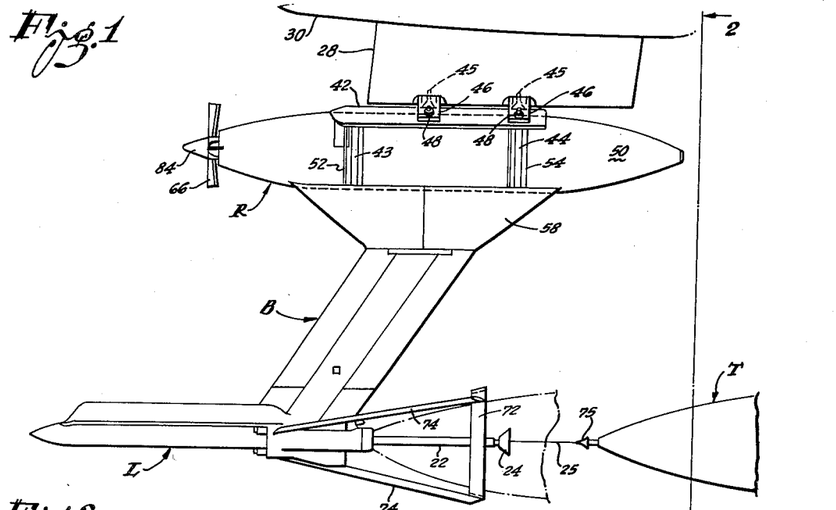
FIG. 1 is a side elevational view of the selected embodiment of the invention mounted on the underside of an aircraft, the view showing the boom in its lower extended position and the launcher in its expanded position with the tow target spaced away from the launcher.
Figures 2, 4A, 10:
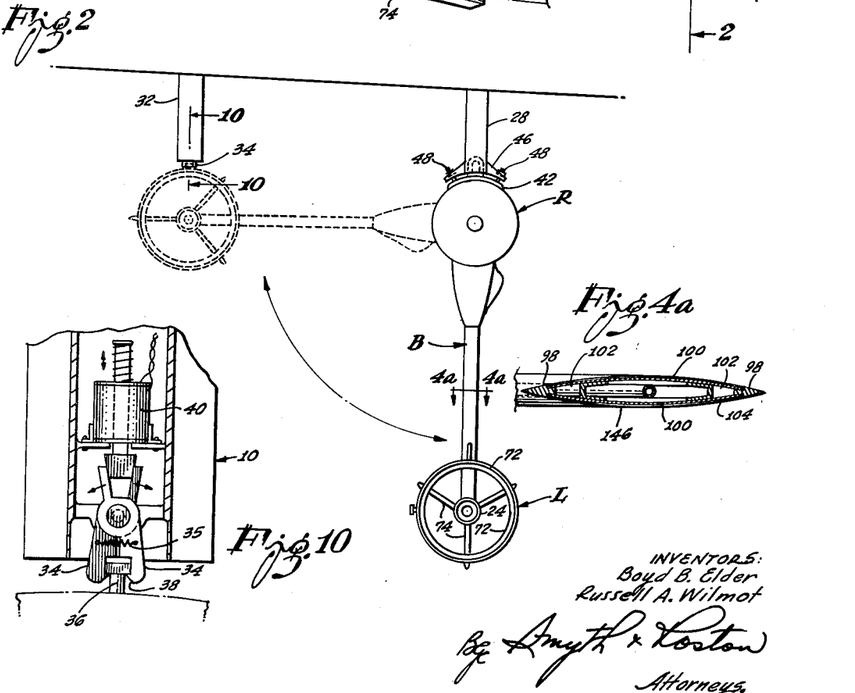
FIG. 2 is an end elevation of the apparatus as seen along the line 2—2 of FIG. 1.
FIG. 4a is a cross section of the boom taken along the line 4a—4a of FIG. 2.
FIG. 10 is a view largely in side elevation and partly in section along the line 10—10 of FIG. 2 showing the construction of the latch for releasably connecting the boom directly to the wing of the aircraft at the upper retracted position of the boom.
Figure 5:
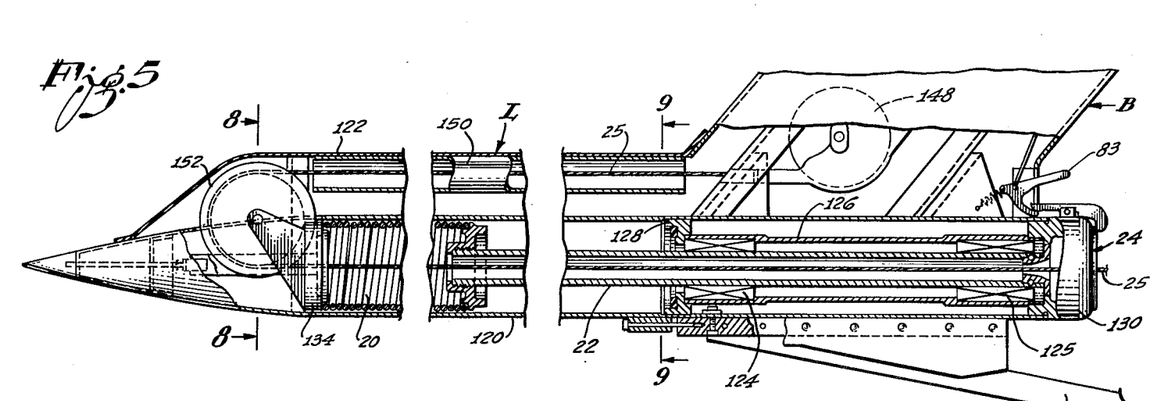
FIG. 5 is a view of the launcher locked in its contracted state, the view being largely in section and partly in side elevation.

FIGS. 1 and 2 show the presently preferred embodiment of the invention which includes a streamlined reeling unit, generally designated R; and a boom or support structure, generally designated B, mounted to swing between an upper retracted position shown in broken lines in FIG. 2 and a lower extended position shown in solid lines, the boom being provided with a launcher, generally designated L, on its outer swinging end. The launcher L is longitudinally contractible from the expanded position shown in solid lines in FIG. 1 to a contracted position that is best shown in FIG. 5, the contraction being against the resistance of a coiled launcher spring 20 to store launching force.

The launcher construction includes a longitudinally movable tube 22 which retracts against the launcher spring 20 and which is formed with a conical seat 24 at its outer end to receive a streamlined tow target, generally designated T, of a well-known construction. The tow target T is connected to a towline 25 which is routed through the launcher seat 24, the launcher tube 22 and the boom B to a reel 26 (FIG. 11) inside the reeling unit R.

The reeling unit R is suitably mounted on a pylon 28 on the underside of the aircraft, in this instance on the underside of a wing 30 of the aircraft and the launcher L is positioned adjacent a second pylon 32 (FIG. 2) on the underside of the wing when the boom is in its upper retracted position. As best shown in FIG. 10, suitable latch means is provided to connect the launcher L directly to the pylon 32 when the boom is swung to its upper retracted position.

In the construction shown, the latch means comprises a pair of jaws 34 which are urged to closed position by a spring 35. The jaws are designed to engage a latch stud 36 on the launcher L, the jaws having inclined surfaces 38 by virtue of which the jaws engage the head of the latch stud automatically in response to upward movement of the latch stud against the jaws. Remote control means including a solenoid 40 shown in FIG. 10 permits the pilot to open the jaws 34 to release the boom to permit the boom to swing to its lower position.

The reeling unit R may be constructed in the general manner of the reeling unit disclosed in the Hopper et al. patent, 2,751,167, dated June 19, 1956, entitled "Reeling Apparatus for Controlling a Tow Cable from an Aircraft," which disclosure is hereby incorporated in the present disclosure by reference. In the present embodiment of the invention the reeling unit R is mounted on the pylon 28 by means of what may be termed a saddle plate 42 and a pair of spaced support rings 43 and 44. The support rings 43 and 44 are rigidly unitary with the saddle plate 42 and the saddle plate in turn is rigidly but releasably mounted on the underside of the pylon 28. In the construction shown, a pair of shackles 45 carried by the saddle plate 42 extend into corresponding recesses on the underside of the pylon 28 and are releasably engaged by well known mounting means (not shown). Associated with each of the shackles 45 is a sway brace 46 of a well-known construction carrying a pair of stabilizing screws 48 (FIG. 2) to bear against the saddle plate 42.

Figure 11:
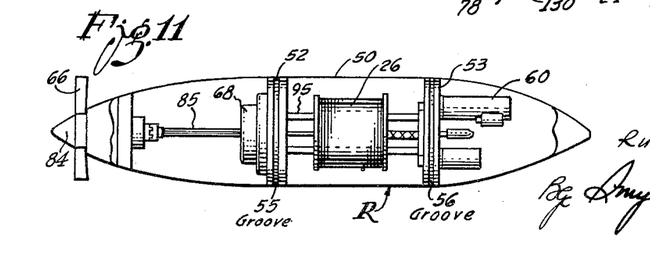
FIG. 11 is a simplified diagrammatic view showing some of the major parts of the reeling unit.

As shown in a simplified manner in FIG. 11, the reeling unit R has a streamlined housing or enclosure 50 which is internally reinforced by a forward circular structure 52 and a rearward circular structure 53. These two circular reinforcing structures 52 and 53 are formed with outer circumferential grooves 55 and 56 respectively to receive the previously mentioned support rings 43 and 44 respectively. Thus the two circular structures 52 and 53 serve as means for journaling the reeling unit in the support rings 43 and 44 for concentric rotation of the reeling unit about its longitudinal axis, which axis is also the axis of rotation of the reel 26. Preferably the two circular structures 52 and 53 are journaled in the corresponding support rings 43 and 44 by corresponding ball bearings 57 shown in FIGS. 3a and 3b.

In the construction shown, the boom B is connected to the reeling unit R in a fixed manner by means concealed in a fairing 58 so that concentric rotation of the reeling unit about its longitudinal axis may be utilized to swing the boom between its two alternate positions. By virtue of this arrangement the inner end of the boom B is hingedly connected directly to the aircraft. Any suitable power-actuated means may be employed to rotate the reeling unit for this purpose. In this particular embodiment of the invention, the power means comprises a motor 60 (FIGS. 3b and 11), the shaft 62 of which carries a pinion 64. The pinion 64 is in mesh with a ring gear 65 inside the reeling unit, which ring gear is fixedly carried by the rearward support ring 44. It is apparent that energization of the motor 60 causes the pinion 64 to travel around the ring gear 65 to cause corresponding rotation of the reeling unit R together with the boom B.

Figure 3A:
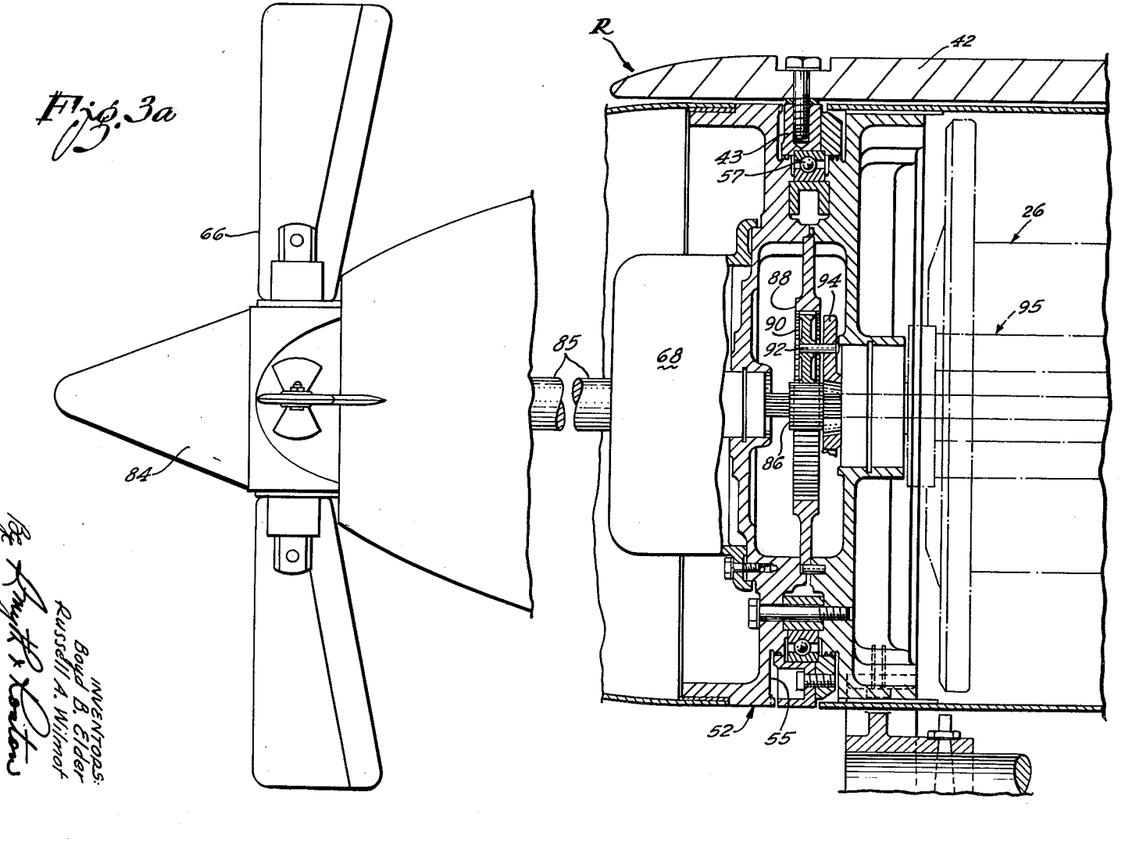
FIGS. 3a and 3b together constitute a broken longitudinal view of the reeling unit, the view being largely in section and partly in side elevation.
Figure 3B:
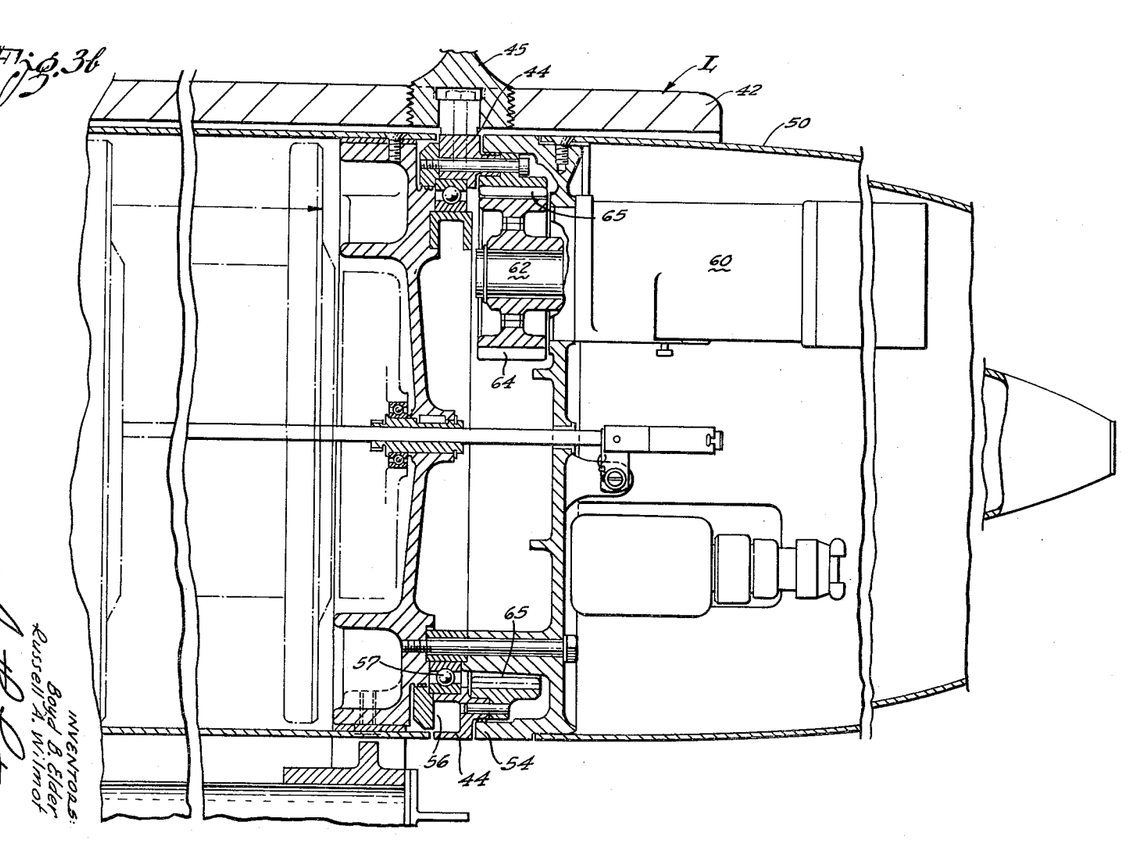

As disclosed in the Hopper patent, 2,751,167, and as shown in FIGS. 3a and 11, the reeling unit R has an air screw 66 of the construction of a variable pitch propeller to actuate the reel 26 and has an electrically actuated brake 68 for decelerating the reel when desired. The pitch of the blades of the air screw 66 is remotely controlled by an operator on the towing aircraft, which operator may be the pilot.

The launcher L includes a rearwardly extending basket-like frame to cradle the forward portion of the tow target T when the tow target is snubbed to the launcher. In the construction shown, the basket-like frame comprises an outer ring member 72 to encircle the forward portion of the tow target and a plurality of divergent frame members 74 that support the ring member from the housing of the launcher.

Figures 6, 6A, 7:
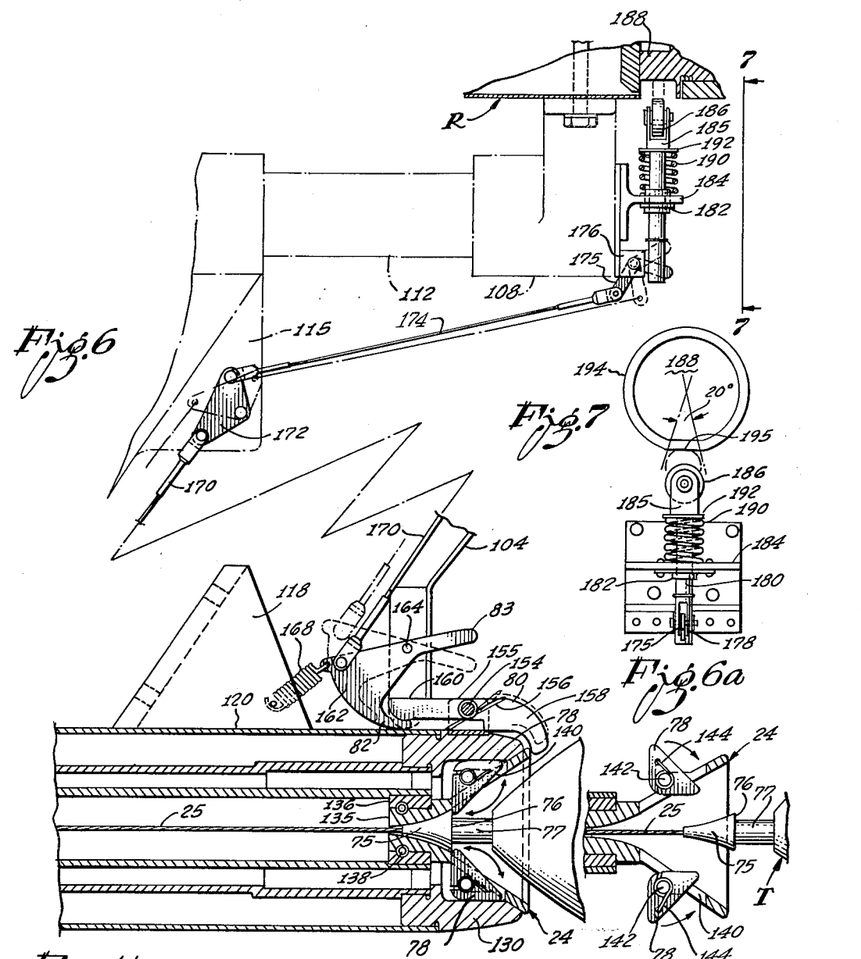
FIG. 6 is a fragmentary view largely in section showing the construction of the locking means that responds to changes in the angular position of the boom.
FIG. 6a is a fragmentary sectional view of the launcher seat showing the tow target about to contact the seat.
FIG. 7 is a side elevation as seen along the line 7—7 of FIG. 6 showing how a follower cooperates with a cam to control the locking means in response to the swinging movement of the boom.
Figure 8:
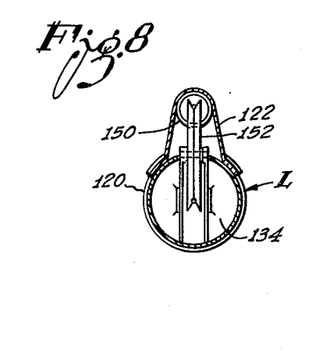
FIG. 8 is a transverse section of the launcher along the line 8—8 of FIG. 5.
Figure 9:
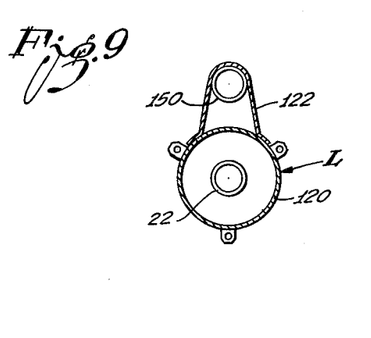
FIG. 9 is a transverse section of the launcher along the line 9—9 of FIG. 5.

As best shown in FIG. 6, the towline 25 is connected to the tow target T by a conical swivel fitting 75 forming a circumferential shoulder 76 and having a shank 77 that extends forward from the body of the tow target. The conical seat 24 at the outer end of the tube 22 of the launcher L is provided with a plurality of latching dogs 78 to engage the shoulder 76 of conical fitting 75 when the tow target is snubbed. When the tow target is away from the conical seat 24 the latching dogs 78 are rotated to their release positions as shown in FIG. 6a. When the launcher tube 22 is shifted longitudinally inwardly by the incoming tow target, the latching dogs 78 encounter fixed portions of the launcher and are thereby rotated to their latching positions shown in FIG. 6. Thus snubbing the tow target by drawing the tow target against the conical seat 24 until the launcher L is completely contracted results in automatic latching of the tow target by the launcher.

When the launcher is completely retracted, a spring biased locking lever 80 overhangs the outer edge of the conical seat 24 in a position to prevent expansion of the launcher. The spring bias of the locking lever 80 is not sufficient to prevent the expansion action of the launcher. If, however, a locking finger 82 is extended under the locking lever 80 in the manner shown in FIG. 6, the locking lever locks the launcher in its contracted state in a positive manner. Since the latching dogs 78 cannot release the tow target unless the launcher is expanded, it is apparent that the locking finger 82 cooperating with the locking lever 80 not only locks the launcher in its contracted state but also locks the snubbed tow target to the launcher. The locking finger 82 is responsive to the swinging movement of the boom and automatically moves into its effective position when the boom is swung upward to its retracted position shown in broken lines in FIG. 2. The locking finger 82 may be manually retracted, however, by a handle 83.

*Operation*

When the towing aircraft is on the ground in preparation for a target practice run, the boom B is in its upper retracted position shown in broken lines in FIG. 2 with the launcher L directly connected to the pylon 32 by the pair of latching jaws 34. In preparation for snubbing a tow target to the launcher L, the launcher is placed in its expanded state. If the launcher happens to be locked in its contracted state, the locking finger 82 may be momentarily retracted manually against spring pressure to release the locking lever 80 for permitting the launcher to expand.

With the towline extending through the expanded launcher, the towline is attached to the nose of a tow target T. With the locking finger 82 manually retracted to free the locking lever 80, the reel 26 is operated by suitable auxiliary means to reel the tow target into its snubbed position. The auxiliary power means may operatively engage the hub or spinner 84 of the air screw 66 for this purpose. When the tow target is completely snubbed the brake 68 of the reeling unit R may be applied to immobilize the reel 26 and then the locking finger 82 is restored to its locking position.

The tow target is automatically locked in its snubbed position by the latching dogs 78 and the launcher is locked in its contracted state by the locking lever 80 and the cooperating locking finger 82. At its snubbed position the tow target is sufficiently elevated and is positioned sufficiently forward on the aircraft to be out of the way during take-off and during landing.

When the target practice area is reached, the operator on the towing aircraft energizes the solenoid 40 by remote control to open the pair of latching jaws 34 and also energizes the motor 60 by remote control to cause rotation of the reeling unit R for swinging the boom B downward from its upper retracted position to the downwardly extending launching position shown in FIGS. 1 and 2. This downward swinging movement of the boom B causes the locking finger 82 to be retracted automatically from under the locking lever 80 to free the locking lever for the launching operation.

To launch the tow target, the brake 68 is released to free the reel 26 whereupon the launcher spring 35 acts to expand the launcher abruptly to eject the tow target rearward from the towing aircraft with corresponding unwinding rotation of the reel. The launching of the tow target is smooth because it is conducted in a substantially non-turbulent environment remote from the turbulent slip stream of the aircraft. The drag on the tow target is usually more than sufficient for paying out the towline 25 at the desired rate. It may be necessary to reverse the pitch of the air screw 66 or to use the brake 68 to avoid rotation of the reel 26 at excessive speed. As soon as the launched tow target is well clear of the towing aircraft, the motor 60 may be energized to swing the boom B back to its retracted position.

When the time arrives for retrieving the tow target T at the end of the target practice the two latching jaws 34 are again released by remote actuation of the solenoid 40 and the motor 60 is again energized for rotation of the reeling unit R to swing the boom from its upper retracted position to its downward position. The reel 26 is then actuated in its winding direction by the air screw 66 until the tow target makes contact with the conical seat 24. The tow target approaches the conical seat and contracts the launcher L in a stable manner since it is out of the range of the turbulent slip stream of the towing aircraft. As the launcher is contracted by the tow target, the latching dogs 78 make contact with the fixed structure of the launcher and are thereby rotated to their positions of engagement with the swivel fitting 75 of the tow target as shown in FIG. 6. When the launcher is completely contratced by the reeling in of the tow target, the brake 68 is applied to keep the tow target snubbed.

When the tow target is completely snubbed, the locking lever 80 overhangs the conical seat 24 as heretofore described. The motor 60 is energized for rotation of the reeling unit to swing the boom to its upper retracted position. As the latching stud 36 on the exterior of the launcher L approaches the pylon 32, it spreads the latching jaws 34 apart and is automatically engaged by the latching jaws. At the same time, the locking finger 82 moves automatically under the locking lever 80 to lock the launcher in its contracted state and thereby lock the tow target to the launcher in a positive manner independently of the towline. The snubbed tow target is again out of the way close to the underside of the aircraft wing to avoid interference with the landing of the aircraft.

*Structural Details*

In accord with the previously mentioned Hopper patent, 2,751,167, the air screw 66 drives a shaft 85 that extends through the brake 68. The drive shaft 85 is connected to the reel 26 by reduction gearing that includes a sun gear 86 on the end of the shaft, a fixed ring gear 88 carried by the forward circular structure 52 and a plurality of planet gears 90 which are actuated by the sun gear to traverse the inner circumference of the ring gear. The planet gears 90 are mounted by spindles 92 on a spider 94 that is unitary with a rotary longitudinal frame 95 on which the reel 26 is slidingly mounted. A mechanism which need not be described causes the reel 26 to reciprocate axially on the rotary frame 95 for level winding of the towline on the reel. The rate at which the air screw 66 rotates the reel is adjustable by remote control means which varies the pitch of the blades of the air screw. The blades may be feathered and may be turned to reverse pitch for reversing the rotation of the reel.

Figure 4:
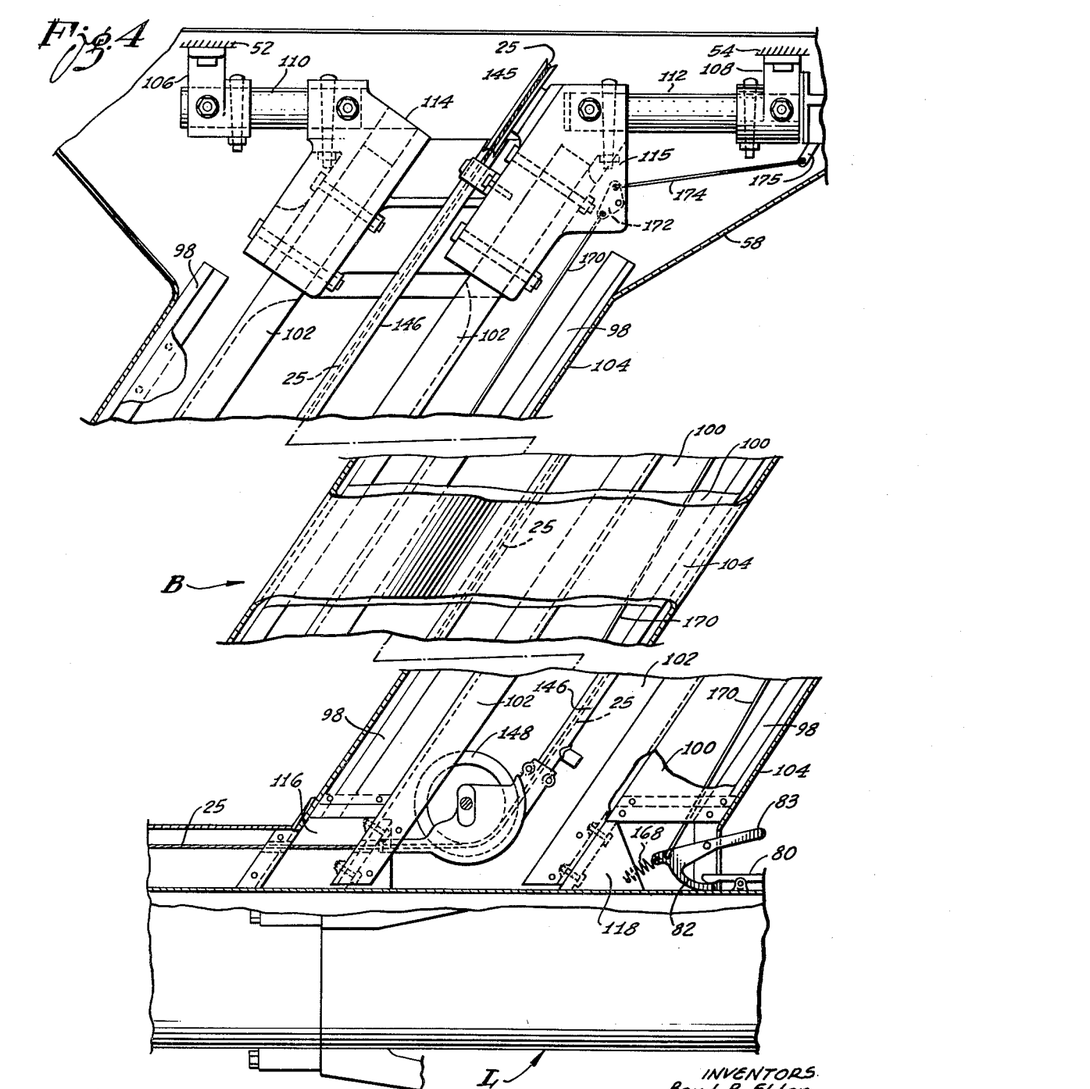
FIG. 4 is a broken view partly in section and partly in side elevation showing the construction of the boom proper.

As indicated in FIG. 4a, the boom B comprises a hollow beam formed by two opposite longitudinal edge members 98 of tapered configuration and two opposite bowed side plates 100 reinforced by internal channels 102. This hollow beam structure is covered by a skin or cowling 104 which joins the previously mentioned fairing 58 adjacent the reeling unit R. As shown in FIG. 4, the inner end of the hollow beam is rigidly connected to the reeling unit R by a pair of brackets 106 and 108 which are secured respectively to the previously mentioned forward and rearward circular structures 52 and 54 of the reeling unit. Fixedly carried by the two brackets 106 and 108 are corresponding axially aligned heavy bars 110 and 112 which, in turn, are rigidly connected to the corresponding channels 102 of the hollow beam structure by a pair of corresponding castings 114 and 115. The outer end of the hollow beam structure is connected to the launcher L by a pair of castings 116 and 118.

As shown in FIGS. 5, 6, 8 and 9, the launcher L may comprise a cylindrical shell 120 with a longitudinal cowling 122 extending along the shell from the boom B to the forward tapered end of the shell. The previously mentioned launcher tube 22 is slidingly mounted in the cylindrical shell 120 by means of a pair of ball bushings 124 and 125. The two ball bushings are mounted in a tube 126 with the forward end of the tube supported by a reinforcement ring 128 and with the rear end of the tube supported by a cylindrical casting 130 at the aft end of the launcher. The forward end of the launcher tube 122 is fitted with a circular casting 132 that backs against the previously mentioned launcher spring 20. The second end of the launcher spring seats against a circular reinforcement casting 134.

As best shown in FIG. 6, the previously mentioned conical seat 24, which is hollow for the passage of the towline therethrough, has a cylindrical base portion 135 which is secured in the forward end of the launcher tube 22 by means of a bushing 136 and a pair of transverse roll pins 138. The previously mentioned latching dogs 78 that are carried by the conical seat 24 extend through corresponding slots 140 in the wall of the seat and are mounted on pivot pins 142. The latching dogs 78 are provided with torque springs 144 which tend to rotate the dogs to the release positions shown in FIG. 6a.

The towline 25 may be routed from the reeling unit R through the boom B and through the launcher L in any suitable manner. In the construction shown in FIGS. 4 and 5, the towline 25 passes from the reel 26 around a guide pulley 145 in the fairing 58 to enter a guide tube 146 inside the hollow beam structure on the boom B. From the guide tube 146, the towline passes around a second guide pulley 148 and extends forward through a tube 150 (FIG. 5) in the launcher cowling 122 to a third guide pulley 152. The towline 25 makes a 180° turn around the third guide pulley 152 to extend rearward through the launcher spring 20, the launcher tube 22 and the conical seat 24 to the swivel fitting 75 on the tow target.

The means for automatic locking of the launcher in its contracted state and thus locking the tow target in the launcher in response to the swinging movement of the boom B may be of the construction shown in FIGS. 6 and 7. The previously mentioned locking lever 80 is pivotally mounted by a pin 154 in a pair of ears 155 on the cylindrical casting 130. The locking lever 80 is provided with a torque spring 156 which urges the locking finger clockwise to place the rearward curved arm 158 of the locking lever in the position shown in FIG. 6 at which the curved arm overhangs and engages the retracted conical seat 24 of the launcher. At this position, the second arm 160 of the locking lever is spaced from the periphery of the launcher shell 120.

The previously mentioned locking finger 82 is an integral part of a bell crank 162 that is mounted on a pivot 164 inside the boom B. The bell crank 162 is formed with the previously mentioned handle 83 and this handle extends outward through a slot in the cowling 104. The bell crank 162 is connected to the casting 118 by a coil spring 168 which urges the bell crank counter-clockwise to urge the locking finger 82 into locking engagement with the second arm 160 of the locking lever 80.

In the construction shown, the bell crank 162 is pivotally connected to a rod 170 which extends through the length of the boom to a bell crank 172. The bell crank 172 is connected by a link 174 with one arm of a bell crank 175 that is pivotally mounted on a bracket 176. The second arm of the bell crank 175 extends through a slot 178 (FIG. 1) on one end of a plunger 180 that is slidingly mounted in a collar 182 in a bracket 184. The second end of the plunger 180 is in the form of a clevis 185 that carries a follower in the form of a roller 186 for cooperation with a fixed cam 188. A suitable coil spring 190 in compression between the bracket 184 and a radial flange 192 of the plunger continuously urges the roller 186 against the fixed cam 188. For this purpose, the coil spring 190 must be stronger than the opposing previously mentioned coil spring 168 that urges the locking finger 82 towards its effective position.

The fixed cam 188 has a circular cam surface 194 that is concentric to the axis of rotation of the boom, i.e., is concentric to the two circular structures 52 and 54 in which the reeling unit R is journaled. The circular cam surface 194 has a circumferential extent of 340°, the remaining 20° of the cam being a flat dwell 195. The flat dwell 195 is so oriented with reference to the boom B that the follower roller 186 contacts this dwell when the boom is in its lower expanded position.

When the follower roller 186 is on the flat dwell 195, the plunger 180 is shifted towards the center of the cam by the plunger spring 190 and the coil spring 168 associated with the bell crank 162 causes the bell crank 175 to follow the longitudinal shift of the plunger. The consequent clockwise rotation of the bell crank 162 withdraws the locking finger 82 from under the arm 160 of the locking lever 80 to unlock the retracted conical seat 24 of the launcher.

Normally the second arm of the bell crank 175 is held at the lower end of the slot 178 of the plunger 180 by the force of the coil spring 168 that is associated with the bell crank 162. The slot 178 provides freedom for counter-clockwise rotation of the bell crank 175 relative to the plunger 180 and thus permits manual retraction of the locking finger 82 by the handle 83 against the resistance of the spring 168 when the aircraft is on the ground with the boom in its upper retracted position.

Figure 12:
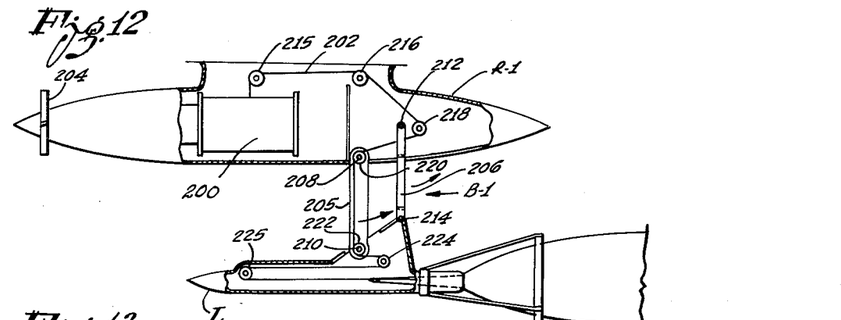
FIG. 12 is a simplified diagrammatic view of a second embodiment of the invention in which the boom comprises a parallel linkage mechanism, the boom being shown in its down position.

In FIG. 12, illustrating the second embodiment of the invention, a reeling unit generally designated R–1 is fixedly mounted on the underside of an aircraft (not shown) in the usual manner and incorporates a reel 200 on which is wound a towline 202, the reel being driven in the usual manner by an air screw 204. The launcher L is mounted on a boom generally designated B–1 which comprises a linkage mechanism. In this instance, the boom is a parallel linkage mechanism, FIG. 12 showing a first link 205 and a second parallel link 206. This linkage mechanism may be power actuated by any suitable means (not shown).

Figure 13:
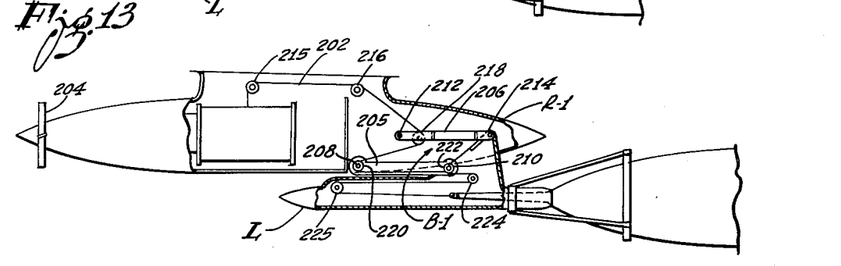
FIG. 13 is a similar view showing the boom in its up position.

One end of the link 205 is connected to the reeling unit R-1 for rotation about an axis 208 and the second end of the link is connected to the launcher L for rotation about an axis 210. In like manner, one end of the second link 206 is connected to the reeling unit for rotation about a pivot axis 212 with the other end of the link connected to the launcher L for rotation about a pivot axis 214. It is apparent that when the described linkage swings the launcher L between the lower position of the launcher shown in FIG. 12 and the upper position shown in FIG. 13, the launcher is maintained at substantially a constant angle relative to the reeling unit R-1.

The cable 202 is routed from the reel 200 to the launcher L along a path that is of constant length throughout the swinging movement of the reel. In the construction shown, the towline 202 is engaged by a series of guide rollers 215, 216, 218, 220, 222, 224 and 225. The two guide rollers 220 and 222 are mounted on the previously mentioned axes 208 and 210 at the opposite ends of the link 205. It is apparent from a comparison of FIGS. 12 and 13 that the wrapping and unwrapping actions of the towline 202 on the guide pulleys 208 and 210, respectively, are equal and opposite, each compensating for the olher, to keep the path of the towline constant in length with resultant constant tension on the towline throughout the swinging movement of the boom. Thus when the boom is swung from the downward position shown in FIG. 12 to the upper position shown in FIG. 13, the towline wraps around an increasing circumferential extent of the guide pulley 208 and at the same time unwraps from the guide pulley 210 to the same extent.

Figures 14, 15:
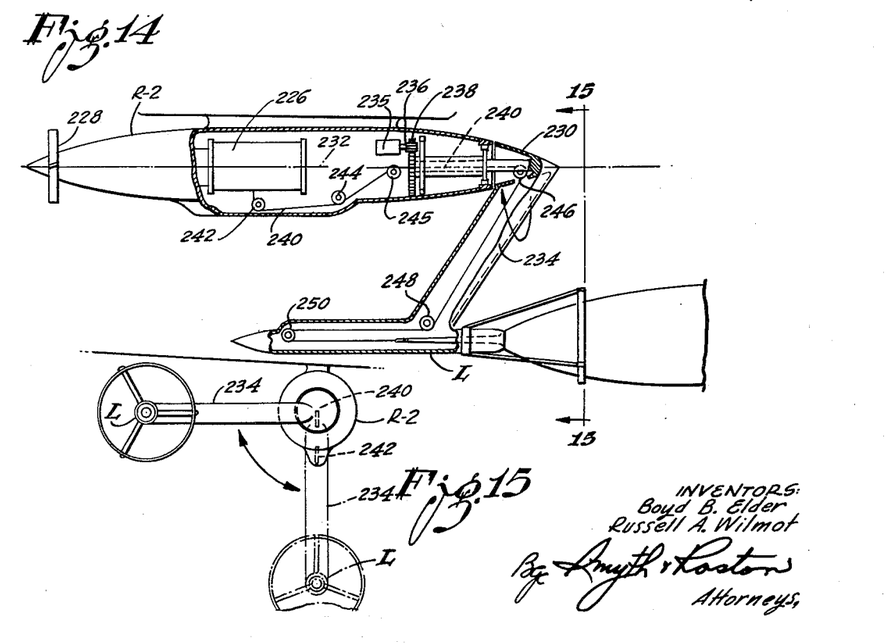
FIG. 14 is a simplified diagrammatic view of a third embodiment of the invention in which the towline is twisted by the swinging action of the boom, the boom being shown in its down position.
FIG. 15 is an end elevation of the third embodiment of the invention.

In the third embodiment of the invention shown in FIGS. 14 and 15, a reeling unit R-2 is fixedly mounted on the underside of an aircraft (not shown) in the usual manner and incorporates the usual reel 226 actuated by an air screw 228. Mounted on the rear end of the reeling unit R-2 as a tapered extension thereof is a housing 230 that is rotatable about an axis 232. Fixedly carried by the housing 230 for rotation therewith is a hollow boom 234 which in turn fixedly carries a launcher L. The housing 230 is actuated for swinging movement of the boom 234 by a motor 235 driving a pinion 236, the pinion being in mesh with a ring gear 238 that is unitary with the rotary housing.

The towline 240 is rounted from the reel 226 to the launcher L by a series of guide rollers 242, 244, 245, 246, 248 and 250. It is to be noted that the portion of the towline 240 that extends between the two guide pulleys 245 and 246 is on the previously mentioned axis 232 about which the boom 234 rotates. It is apparent, therefore, that rotation of the boom merely causes this portion of the towline to twist or untwist without change in lengh of the path of the towline and consequently without any significant change in the tension of the towline.

Our description in specific detail of the presently preferred embodiment of the invention will suggest various changes, substitutions and other departures from our disclosure within the spirit and scope of the appended claims.

We claim:

1. In an installation on an aircraft for launching a tow target on a tow line, the combination of: a power-actuated reel with said tow line wound thereon; an enclosure for said reel; a launcher separate from said enclosure and positioned laterally thereof, said launcher having a seat for carrying the tow target; a support structure for said launcher extending from said enclosure to the launcher, said support structure being pivotally movable between an upper retracted position placing the launcher close to the aircraft for landing and take-off and a downwardly extended position placing the launcher away from the turbulent slip stream for launching the tow target; actuating means to swing said support structure between its retracted and extended positions; and means to route said tow line from said reel to the outer end of said pivotally movable support structure along a path of constant length to maintain the tension of the tow line substantially constant throughout the swinging movement of the support structure while the tow target is supported by the launcher.

2. A combination as set forth in claim 1 in which said enclosure has a longitudinal axis and said support structure maintains the launcher substantially parallel with said aixs at both the retracted and extended positions of the support structure.

3. A combination as set forth in claim 1 in which said support structure comprises a linkage mechanism; and in which said means for routing the towline includes a plurality of guide pulleys positioned for wrapping action by the towline on one guide pulley and simultaneous and opposite unwrapping action by the towline on another guide pulley for maintaining the towline under substantially constant tension during the swinging action of the support structure.

4. A combination as set forth in claim 3 in which said two guide pulleys are on two different axes of pivotal action of the linkage mechanism.

5. A combination as set forth in claim 1 in which said support structure swings about an axis and a portion of said towline extends along the axis of the swinging movement of the support structure for twisting and untwisting action on said portion of the towline by the swinging movement of the support structure without significant change in tension of the towline.

6. A combination as set forth in claim 1 which includes latch means to releasably connect the outer end of the support structures to the aircraft at the retracted position of the support structure.

7. A combination as set forth in claim 6 in which said latch means automatically engages the outer end of the support structure in response to movement of the support structure to its retracted position; and which includes means to release the latch means by remote control on the aircraft.

8. A combination as set forth in claim 1 which includes means to releasably latch the tow target in snubbed position in said seat.

9. A combination as set forth in claim 8 which includes means to lock said latch means closed in response to movement of the support structure out of its downwardly extending position for positive prevention of release of the tow target from said seat while the support structure is in its upper retracted position.

10. A combination as set forth in claim 9 in which said locking means is manually releasable to permit a tow target to be seated in said seat and snubbed therein when the aircraft is on the ground with the support structure in its upper retracted position.

11. A combination as set forth in claim 9 in which said response locking means includes a fixed cam on the aircraft; a follower on the support structure in contact with the cam; and a locking means responsive to said follower.

12. In an aircraft tow target installation wherein the aircraft carries a launcher that is spring actuated for extension to launch a tow target and wherein the aircraft carries a reel with the tow target connected to a towline wound on the reel, the combination therewith of: a support structure with said launcher mounted on one end thereof and with the second end pivotally mounted on the aircraft to swing between an upper retracted position lying close to the aircraft for landing and take-off and a position extending downward with said launcher away from the turbulent slip stream of the aircraft for launching and retrieving the tow target; power means to swing said support structure between its retracted and extended positions; means to route said towline from the reel along the support structure to the launcher; a latch to hold said launcher in its retracted position; and means to lock said latch closed in response to movement of the support structure out of its downwardly extending position for positive prevention of operation of the launcher while the support structure is in its upper retracted position.

13. A combination as set forth in claim 12 which includes a second latch to hold the tow target snubbed to the launcher, said second latch being effective in response to retraction of the launcher, whereby locking the launcher in its retracted position also locks the tow target to the launcher.

14. In an aircraft tow target installation wherein the aircraft carries a reel with a tow target conncected to the aircraft by a towline wound on the reel, the combination therewith of: a housing for said reel; means to support said housing on the aircraft with freedom for the housing to rotate about a longitudinal axis; a boom provided with a seat at one end for snubbing the tow target and fixedly connected at its other end with said housing for support by the housing, said boom extending laterally from the housing; means to route said towline from said reel through said boom to said seat; and power means to rotate said housing to swing the boom between an upper retracted position lying close to the aircraft for landing and take-off and a lower downwardly extending position with said seat spaced away from the slip stream of the aircraft for launching and retrieving the tow target.

15. A combination as set forth in claim 14 in which said means to support the housing includes a fixed ring gear exposed inside the housing; in which a pinion journaled in the housing meshes with said ring gear to rotate the housing; and in which said power means is connected with said pinion.

16. A combination as set forth in claim 5 in which the pivoted end of the support structure is mounted on the aircraft by a pylon; and in which said latch means connects the outer end of the support structure to a second pylon on the aircraft.

17. A combination as set forth in claim 16 in which a launcher is mounted on said one end of the support structure and said seat is part of the launcher; and in which said linkage mechanism is a parallel linkage mechanism to maintain the angle of the launcher relative to the aircraft substantially constant throughout the swinging action of the support structure.

References Cited in the file of this patent

UNITED STATES PATENTS

| | | |
|---|---|---|
| 1,833,199 | Beagle | Nov. 24, 1931 |
| 2,369,820 | Douglas | Feb. 20, 1945 |
| 2,464,073 | Cotton | Mar. 8, 1949 |
| 2,751,167 | Hopper et al. | June 19, 1956 |
| 2,848,179 | Troxell et al. | Aug. 19, 1958 |
| 2,876,677 | Clark et al. | Mar. 10, 1959 |
| 2,953,442 | Hopper et al. | Sept. 20, 1960 |